United States Patent [19]

Jacoby

[11] 3,731,538

[45] May 8, 1973

[54] GRAVIMETER

[75] Inventor: Hans-Dieter Jacoby, Berlin, Germany

[73] Assignee: Continental Elektroindustrie Aktiengesellschaft, Berlin-Mariendorf, Germany

[22] Filed: Feb. 10, 1970

[21] Appl. No.: 10,230

[30] Foreign Application Priority Data

Feb. 14, 1969 Germany..................P 19 08 232.7

[52] U.S. Cl. ...................................................73/382
[51] Int. Cl. .............................................G01v 7/16
[58] Field of Search ..........................73/382, 517 B

[56] References Cited

UNITED STATES PATENTS

| | | | |
|---|---|---|---|
| 2,809,524 | 10/1957 | Masterson | 73/382 |
| 3,477,293 | 11/1969 | Brede | 73/382 |
| 3,483,753 | 12/1969 | Loeb | 73/382 |
| 3,495,460 | 2/1970 | Ward | 73/382 |
| 3,030,814 | 4/1962 | Ainsworth | 73/517 B X |
| 3,417,621 | 12/1968 | Schulze et al. | 73/382 |

*Primary Examiner*—James J. Gill
*Attorney*—Curt M. Avery, Arthur E. Wilfond, Herbert L. Lerner and Daniel J. Tick

[57] ABSTRACT

A compensating arrangement acts on the mass and is connected to the input of the integral transfer unit of a gravimeter system. The measuring indicator is connected to the output of the integral transfer unit via the compensating arrangement and a low pass filter whereby a signal proportional to the position of the mass is transferred to the compensating arrangement in a manner which compensates for the measuring force in the sense of a negative feedback thereby suppressing the short period accelerating forces acting on the gravimeter system and preventing such accelerating forces from affecting the indication of the measuring indicator.

5 Claims, 4 Drawing Figures

Inventor:
Hans-Dieter Jakoby

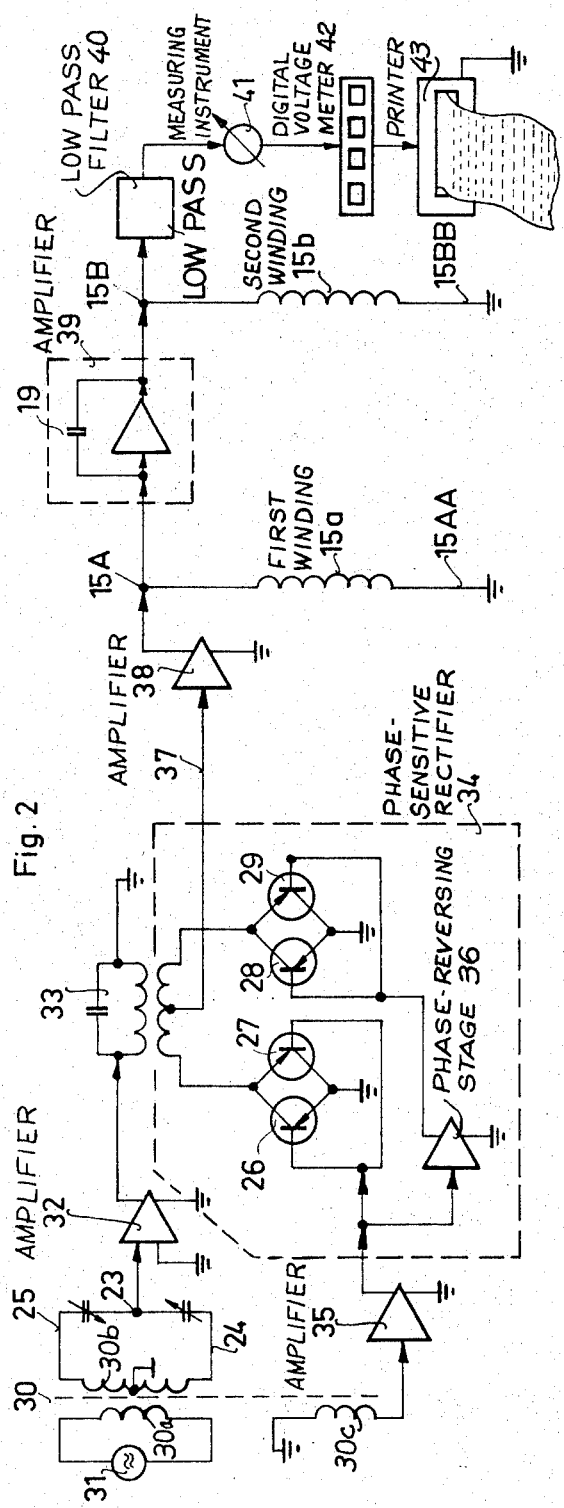
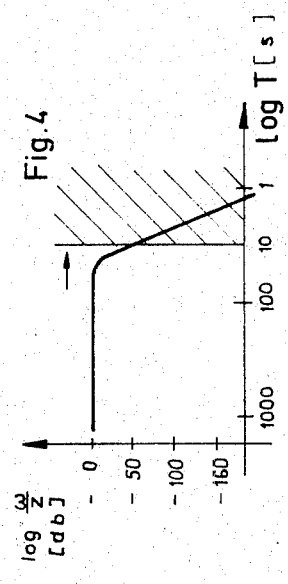
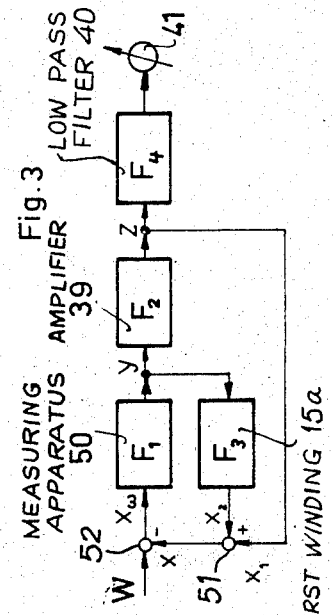
Inventor:
Hans-Dieter Jakoby

GRAVIMETER

DESCRIPTION OF THE INVENTION

The invention relates to a gravimeter. More particularly, the invention relates to a gravimeter for measuring the gravity of the earth on a variable site such as, for example, an aircraft or a seagoing vessel moving along a course.

The gravimeter of the invention includes a feedback and operates in accordance with the principle of automatic force compensation. The gravimeter of the invention comprises a support structure of stable position. A mass is displaceable on the support structure along a planar path containing the gravimeter vector against restoring forces and having a degree of freedom of movement. A device coacting with the mass converts the position of the mass, relative to the stationary position of the housing, into an electrical measurement signal. A device is charged by the electrical signal and controls a current which is varied in accordance with said signal. An electrical system, which is preferably an electromagnetic system, is controlled by the current and acts upon the mass in order to compensate for the forces affecting the mass. The signal path of the compensating current circuit may be connected, via a low pass filter, to a measuring device which indicates and/or records the gravimeter measurement. A transfer member of integral transfer operation is connected in the signal path of the feedback branch between the converter and the electromagnetic system. A gravimeter of similar design transfers the electrical measurement signal through a low pass filter. The signal is amplified by an amplifier which transfers such signal proportionally and supplies it to a permanent electromagnetic system as a direct current. The voltage drop across a winding of the electromagnetic system acts upon a measuring device which registers the gravity of the earth.

The complete device, as aforedescribed, is designed in a manner whereby the interfering frequency, which is determined for the measuring device, of the feedback branch which produces the force compensation for the gravimeter mass, decreases sharply following higher frequencies. This decrease is necessary in order to eliminate the spurious or interfering forces from the indication provided by the measuring device. The spurious forces act upon the measuring system and are traceable to the movement of the site. Furthermore, the spurious forces superimpose the acceleration of gravity.

It is necessary to eliminate from the measurement indication all forces having frequencies which exceed a given frequency limit. The frequency limit is, in actuality, approximately 0.1 Hertz, since the interfering forces normally exceed such frequency and a change in the gravity of the earth may result in fluctuations of the measured quantity, which fluctuations decrease below said frequency, at a normal speed and at normal gravity profiles of the vehicle or vessel, or the like, supporting the gravimeter.

Known gravimeters could only comply with the foregoing requirements to an incomplete extent, since the decrease in frequency of the frequency characteristic of the control circuit of a compensation system cannot extend beyond a specific limit at a specific circuit amplification, in order to insure the preservation of its stability.

Another disadvantage of known gravimeters is that the low pass filter connected in the feedback branch functions as a delay member and has an adverse effect upon the position regulation of the gravimeter mass, effected by the feedback.

The principal object of the invention is to provide a new and improved gravimeter.

An object of the invention is to provide in a gravimeter of the aforedescribed type an arrangement which maintains the stability of the control circuit and at the same time suppresses interfering acceleration forces with frequencies above a predetermined frequency limit as completely as possible, so that below a predetermined frequency limit all interfering components are rapidly suppressed. In this regard, an improvement in the attainable quality control is achieved despite the utilization of a low pass filter associated with the indicating device.

In accordance with the invention, a gravimeter suppresses short period accelerating forces acting upon said gravimeter, in accordance with the indication or signal of the indicating system. The indicating system, which includes the low pass filter, is connected after the integral transfer device to the signal device of the feedback branch. A signal proportional to the position of the gravimeter mass, which signal is provided before the integral transfer device, is transferred from the signal path to a parallel transmission path of an electromagnetic system. The signal in the parallel transmission path is supplied to the electromagnetic system, which system acts on the mass, so that the signal compensates for the measuring force in the sense of a feedback.

In accordance with the invention, a gravimeter for measuring the gravity of the earth includes a gravimeter system having a feedback coupling and providing automatic force compensation. The gravimeter system comprises a support structure stabilized in position. A gravimeter mass is supported in the support structure for movement along a planar path containing the gravity vector against restoring forces and having a single degree of freedom of movement. A converter coupled to the gravimeter mass converts the position of the mass relative to the support structure into an electrical signal. A current control coupled to the converter controls an electrical current in accordance with the electrical signal. An electromagnetic system has an electrically controllable field coupled to the current control for compensating for outside forces acting on the gravimeter mass. A measuring device indicates and records the electrical current thereby indicating and recording the force of gravity on the gravimeter mass. A low pass filter couples the measuring device to the electromagnetic system. An integral transfer device connected between the electromagnetic system and the converter is connected in series with the low pass filter and the measuring device and in parallel with the electromagnetic system in a manner whereby a signal proportional to the position of the gravimetric mass is transferred to the electromagnetic system prior to transfer to the integral transfer device and the electromagnetic system acts upon the gravimeter mass in a manner whereby the electrical signal compensates the measuring force in the sense of a feedback coupling thereby suppressing the short period accelerating forces acting upon the gravimeter system and preventing the accelerating forces from affecting the indication of the measuring device.

The electromagnetic system has a winding with a substantially proportional transfer characteristic. The electromagnetic system comprises a core affixed to the gravimeter mass, a pair of windings on the core and a magnet of substantially hollow cylindrical configuration. The core and the windings are positioned in the magnet.

The gravimeter mass is supported in the support structure free of damping means. The gravimeter mass is supported in the support structure in a manner whereby the mass is constrained to movement in a linear path.

In order that the invention may be readily carried into effect, it will now be described with reference to the accompanying drawings, wherein:

FIG. 2 is a circuit diagram of the electrical system of the measuring system of the gravimeter of FIG. 1;

FIG. 3 is a block diagram of the measuring and electrical systems of FIGS. 1 and 2; and FIG. 4 is a graphical presentation illustrating the amplitude frequency of the gravimeter of the invention on a logarithmic scale.

In the FIGS., the same components are identified by the same reference numerals.

Figure 1:
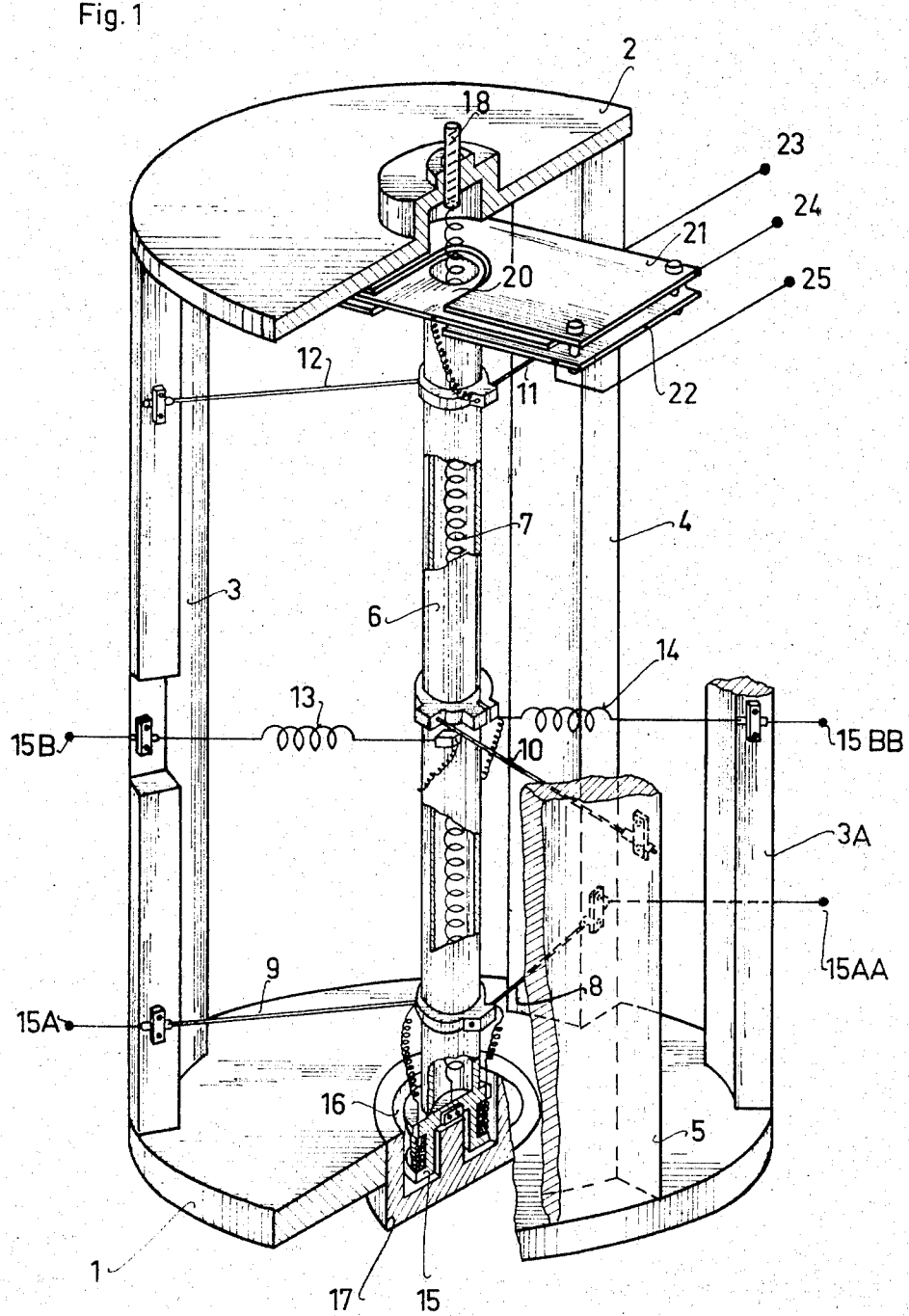
FIG. 1 is a perspective cut-away view, partly in section, of an embodiment of the measuring system of the gravimeter of the invention.

In FIG. 1, the support structure of the gravimeter comprises a base plate 1 and a head plate 2. The plates 1 and 2 are rigidly connected to each other via struts, posts, or the like, 3, 4 and 5. The struts 3, 4 and 5 are equiangularly spaced from each other and are thus at 120° from each other. The struts 3, 4 and 5 and the base and head plates 1 and 2 are all housed in a housing which is rigidly affixed to said base plate, and is not shown in the FIGS. in order to maintain the clarity of illustration.

The temperature of the interior of the housing is regulated and maintained at a constant temperature. This is accomplished by any suitable means, such as, for example, sealing the housing in pressure-tight condition and controlling the temperature therein with a thermostatic system. The housing may be mounted on a platform which is stabilized by any suitable centrifugal apparatus, so that it always assumes the same position relative to a horizontal plane, which position is independent from the fluctuations of the vehicle or vessel which supports such platform.

A tubular mass 6 of light metal is suspended from the head plate 2 via a spiral spring 7. The spiral spring 7 is positioned in the interior of the tubular mass 6. The upper end of the spiral spring 7 is affixed to a threaded rodlike member 18 which is threadedly mounted in the head plate 2 in a manner whereby it may be readily displaced relative to the plane of said head plate. The lower end of the spring 7 is affixed to the lower end of the tubular mass 6, which lower end is at the greatest distance from the threaded member 18.

Five metal tension wires, or the like, 8, 9, 10, 11 and 12 are utilized to constrain the tubular mass 6 to a linear path of movement. The wires, or the like, 9 and 12 are preferably coplanarly disposed and the wires, or the like, 8 and 11 are preferably coplanarly disposed at an angle of 120° from the wires 9 and 12. The wire, or the like, 10 is preferably disposed at an angle of 120° from each of the wires 8, 9, 11 and 12. Each of the wires or the like 8, 9, 10, 11 and 12 tangentially engages the outer surface of the tubular mass 6 at one end of said wire.

Each of the wires 8, 9, 10, 11 and 12 is affixed at its other end to a corresponding one of the struts 3, 4 and 5. The wire 8 is thus affixed at its other end to the strut 4, the wire 9 is affixed at its other end to the strut 3, the wire 10 is affixed at its other end to the strut 5, the wire 11 is affixed at its other end to the strut 4 and the wire 12 is affixed at its other end to the strut 3.

The five tension wires 8, 9, 10, 11 and 12 are kept taut by two tension springs 13 and 14. Each of the springs 13 and 14 is tangentially affixed at one end to the outside surface of the tubular mass 6. The other end of the tension spring 13 is affixed to the strut 3 and the other end of the tension spring 14 is affixed to a strut or housing portion 3A which is positioned diametrically opposite the strut 3. The tension springs 13 and 14 thus constrain the tubular mass 6 to movement in a linear path corresponding to its longitudinal axis.

The tension wires 8 and 9 are coplanarly positioned in a plane perpendicular to the axis of the tubular mass 6. The tension wires 11 and 12 are coplanarly positioned in a plane perpendicular to the tubular mass 6 and therefore parallel to the plane of the tension wires 8 and 9. The tension wire 10 is positioned in a plane perpendicular to the tubular mass 6 and parallel to, and positioned between, the planes of the tension wires 8, 9 and 11, 12.

Each of the tension wires 8, 9, 10, 11 and 12 and each of the tension springs 13 and 14 is affixed at each of its ends in a manner whereby it is electrically insulated from the tubular mass 6 and from the struts 3, 4, 5 and 3A.

The lower end of the tubular mass 6 is connected to a winding member or core 15 which is movable, with said tubular mass, in the air gap of a substantially cylindrical permanent magnet 17. The permanent magnet 17 is of substantially cylindrical configuration with a closed lower base and an open upper base. The core 15 carries two windings whose end turns are electrically connected to the tension wires 8 and 9 and the tension springs 13 and 14. One of the windings may be connected to a circuit via terminals 15A and 15AA, via the tension wires 9 and 8. The other of the windings may be connected to a circuit via terminals 15B and 15BB, via the tension springs 13 and 14. The circuit connected to the terminals 15A and 15AA and to the terminals 15B and 15BB is a source of current.

The upper end of the tubular mass 6 is rigidly affixed to a metal plate 20 in an electrically insulated coupling. The metal plate 20 is movable in the air gap or space of a capacitor which is stationarily affixed in the housing. The capacitor comprises a pair of spaced parallel metal plates 21 and 22. The intermediate metal plate 20 is positioned between the metal plates 21 and 22 of the fixed capacitor. The plate 20 is electrically connected to the tension wire 11, which tension wire is connected to an output terminal 23. The output terminal 23 is thus electrically connected to the plate 20 via an electrical conductor.

The plates 20, 21 and 22 function as an electrical differential capacitor, the capacitances of which are determined by the plates 20 and 21 and the plates 20 and 22. The capacitances of the differential capacitor 20, 21, 22 are varied in opposite directions and in equal magnitudes in accordance with the movement of the tubular mass 6. A terminal 24 is electrically connected to the plate 21. A terminal 25 is electrically connected to the plate 22.

In FIG. 2, a transformer 30 has primary, secondary and tertiary windings 30a, 30b and 30c. The plates 21 and 22 of the differential capacitor of FIG. 1 are connected via their terminals 24 and 25 to the ends of the secondary winding 30b. A generator 31 is connected to the ends of the primary winding 30a and supplies high frequency alternating voltage to said primary winding. The constant frequency alternating voltage applied to the primary winding 30a is in opposite phase with the voltage applied to the differential capacitor 20, 21, 22.

The voltage at the center plate 20 of the differential capacitor 20, 21, 22 is provided at the terminal 23 of said plate and is applied to an amplifier 32. The amplitude of the voltage at the plate 20 is proportional to the position of said plate. When the plate 20 crosses the center position between the plates 21 and 22, the phase of the voltage of the plate 20 is reversed, so that it is shifted by 180°. The center position of the plate 20 between the plates 21 and 22 is the zero position of the tubular mass 6. The voltage on the plate 20 is applied to a phase-sensitive rectifier 34 via a transformer 33.

The phase-sensitive rectifier 34 is energized via the transformer 30, as well as the transformer 33. That is, the tertiary winding 30c of the transformer 30 is coupled to an input of the rectifier 34 via an amplifier 35 and a phase reversing stage 36. There is thus an auxiliary voltage, derived from the output voltage of the generator 31, applied to the rectifier 34 to provide in-phase rectification of the output voltage of the amplifier 32.

The direct voltage provided by the phase-sensitive rectifier 34 is applied via a lead 37 to an amplifier 38. The voltage provided by the rectifier 34 is proportional in magnitude to the position of the tubular mass 6 (FIG. 1) and changes its polarity when said mass moves to either side of its zero position. That is, when the tubular mass 6 is above its zero position, the polarity of the voltage provided by the rectifier 34 is either positive or negative, and when said tubular mass is below its zero position, the output voltage of said rectifier is of the opposite polarity. The zero position of the tubular mass 6 may be adjusted by adjustment of the threaded member 18.

The amplifier 38 amplifies the voltage applied to it and applies the amplified voltage to a winding 15a, which winding is one of the two windings 15a and 15b mounted on the core 15 (FIG. 1) affixed to the lower end of the tubular mass 6. The DC voltage applied to the winding 15a by the amplifier 38 thus energizes said winding. The DC voltage provided by the amplifier 38 is also applied via an integral transferring amplifier 39 to the second winding 15b of the core 15 (FIG. 1). The voltage drop at the winding 15a is thus applied to the amplifier 39.

The amplifier 39 may comprise any known type of feedback operational amplifier comprising a capacitor 19 connected in its feedback branch. The amplifier 39 energizes the second winding 15b with a direct current which varies in accordance with a time integral and the voltage applied to its input.

The output of the amplifier 39 is applied to a low pass filter 40. The low pass filter 40 comprises frequency-dependent feedback operational amplifiers. The low pass filter 40 is connected to a direct current measuring instrument 41 which, by its meter indication, indicates the gravity of the earth. A digital voltage meter 42 is connected to the measuring instrument 41 and provides a digital indication of the gravity of the earth. A printer 43 is connected to the digital voltage meter 42 and prints the digital indication of the gravity of the earth provided by said digital voltage meter.

In FIG. 3, measuring apparatus 50 comprises the measuring apparatus of FIG. 1. The measuring apparatus 50 is influenced by outside forces W. The measuring apparatus 50 has a frequency characteristic $F_1$. The signal y is provided by the amplifier 38 and is supplied to the amplifier 39. The amplifier 39 has a frequency characteristic $F_2$. The signal y provided by the amplifier 38 is also supplied to the winding 15a, which winding has a frequency characteristic $F_3$. The signal z is provided by the amplifier 39 and is supplied to the low pass filter 40, which filter has a frequency characteristic $F_4$.

The amplifier 39, as shown in FIG. 3, produces an output signal $x_1$, and the first winding 15a produces an output signal $x_2$. The signals $x_1$ and $x_2$ are added to each other in an adder 51 and the resultant sum $x$ is supplied to an adder 52 in the input of the measuring apparatus 50. The resultant sum $x$ is supplied to the input of the measuring apparatus 50 as a feedback signal. The resultant sum $x$ is subtracted from the forces W by the adder 52 and the resultant difference $x_\omega$ is supplied to the measuring apparatus 50.

If $$x_1 + x_2 = x$$

and $$W - x = x_\omega$$

then $$F_o = x/x_\omega = F_1(F_2 + F_3)$$

wherein $F_o$ is the frequency characteristic of the control circuit.

$$F_z = z/W$$

wheren $F_z$ is the recurrence frequency and $z$ is the output magnitude of the amplifier 39.

It thus follows that:

$$F_z = z/W = (F_1 F_2 x_\omega)/W = F_1 F_2 (x_\omega/x_\omega + x)$$

$$= F_1 F_2 (1)/(1 + F_o) = (F_1 F_2)/[1 + F_1(F_2 + F_3)] \quad (1)$$

Equation (1) indicates that the frequency characteristic $F_2$ may be selected as low as desired, at an increasing frequency, provided that the frequency characteristic $F_3$ remains sufficiently high in this range. If it is established, therefore, that the measuring system 50 has an amplification $r_{01}$ which equals 100, for example, and does not have time delays, which is approximately correct since there is no or slight damping of the measuring apparatus in FIG. 1, then, in order to suppress all interfering or disturbing forces having frequencies $\omega \le 1$ per second, for example, $$F_3 = (r_{13}j\omega + r_{03})/(1 + T_{13}j\omega) \quad (2)$$

wherein
$r_{13} = 1000$
$T_{13} = 1$ second
$r_{03} = 1$
and $$F_2 = (r_{-12}/j\omega)/(1 + T_{12}) \quad (3)$$

whereby $r_{-12}$ and $T_{12}$ may be selected for
$r_{-12} = 0.01$ per second
and
$T_{12} = 100$ seconds In each of Equations (1), (2) and (3), $F_1$, $F_2$ and $F_3$ are the frequency characteristics or transfer functions of the measuring apparatus 50, the amplifier 39 and the first winding 15a, respectively, indicated in the Bode diagram wherein $j = \sqrt{1}$, and $\omega$ is the frequency of the forces which act upon the gravimeter mass 6. The frequency characteristic $F_2$ is selected as that of the integral transfer unit 39 and the frequency characteristic $F_3$ is selected as that of a delay member of the first order connected in parallel with a constant transformer unit in the conventional manner, as disclosed in, for example, W. Oppelt: "Kleines Handbuch Technischer Regelvorgange" (Small Pocketbook for Technical Control Processes) published by Chemie GmbH, 1956. The aforedescribed dimensioning is not difficult to achieve and results in an attenuation of all interfering or disturbing vibrations having frequencies greater than 0.1 Hertz. Vibrations having frequencies greater than 0.1 Hertz are greater than 20 db per decade and may amount to 150 db per decade and greater without substantially affecting the stability of the feedback. My invention thus provides an almost ideal suppression of all disturbing or interfering forces, whereby delays caused by the low pass filter 40 no longer influence the control.

The invention is, of course, not limited to the aforedescribed embodiment. The windings 15a and 15b may be replaced by a single winding passed by both currents together and the transfer characteristic of the signal of the adder 52 can be selected to vary from the characteristic of the device 51 (integral transfer device 39 according to FIG. 2). Also a further adder, for example with differential transfer characteristics, can be installed in the negative feed back path. Furthermore, an additional proportional signal may be transferred via the amplifier 39. The electromagnetic compensating arrangement may be replaced, at a reduction of the gravimeter mass, by electrostatic apparatus comprising a capacitor controlled by an electrical voltage.

While the invention has been described by means of a specific example and in a specific embodiment, I do not wish to be limited thereto, for obvious modifications will occur to those skilled in the art without departing from the spirit and scope of the invention.

I claim:

1. A gravimeter for measuring the gravity of the earth on a moving vehicle with a gravimeter measuring system having feedback in accordance with the principle of automatic force compensation, the gravimeter system including a position-stabilized housing, a mass movable in the housing along a vertical path containing the gravity vector against restoring forces with one degree of freedom of motion, translating means cooperating with the mass for translating its position relative to fixed parts of the housing into an electrical measuring signal, current means acted upon by the electrical measuring signal for controlling an electrical current variable with the electrical measuring signal, a motor means for applying forces to said mass along said vertical path, a first negative feedback path connected to the output of said current means and to said motor means for applying a force opposing motions of the mass, an integrating circuit connected to the output of said current means, a second feedback path connecting the output of the integrating circuit to the motor means for applying forces opposing motions of the mass, a low pass filter connected to the output of the integrating circuit, and measuring means connected to the output of the filter for indicating the force of gravity, whereby a signal proportional to the position of the mass is transferred to the motor means in a manner which compensates for the measuring force in the sense of a negative feedback thereby suppressing the short period accelerating forces acting on the gravimeter system and preventing the short period accelerating forces from affecting the indication of the measuring means.

2. A gravimeter as claimed in claim 1, wherein said motor means comprises an electromagnetic system having a winding and capacitance means connected to the winding with a substantially proportional transfer characteristic.

3. A gravimeter as claimed in claim 1, wherein said motor means comprises an electromagnetic system comprising a core affixed to said mass, a pair of windings on said core and a magnet of substantially hollow cylindrical configuration, said core and said windings being positioned in said magnet.

4. A gravimeter as claimed in claim 1, wherein said mass is freely supported in said housing.

5. A gravimeter as claimed in claim 1, wherein said mass is supported in said housing in a manner whereby said mass is constrained to movement in a linear path.

* * * * *